Dec. 6, 1932.    C. H. CAINE    1,890,312
CONDENSER
Filed March 30, 1931

Inventor:
Charles H. Caine.

Patented Dec. 6, 1932                                          1,890,312

UNITED STATES PATENT OFFICE

CHARLES H. CAINE, OF CHICAGO, ILLINOIS, ASSIGNOR TO TUNG-SOL CONDENSERS INC., OF CHICAGO, ILLINOIS, A CORPORATION OF ILLINOIS

CONDENSER

Application filed March 30, 1931. Serial No. 526,225.

This invention relates to condensers and the method of making the same.

Radio sets and other similar devices employing thermionic tubes make extensive use of relatively small condensers as by-pass condensers, filter condensers, and the like. Space is frequently at a premium in devices of this kind and the condensers used in it must therefore be made as compactly as possible so that they will occupy a minimum of space in the assembly.

In many devices of this kind, condensers of this type must be provided with terminal wires projecting from them, these wires being soldered to terminals in the device itself, and serve both as a connecting means for the condenser and also as a mechanical support for it. In the prior art of which I am aware, condensers of this type have heretofore been made by wrapping the alternate layers of foil and paper around a non-metallic mandrel, generally wood, with the foil projecting from the opposite end of the cylinder thus formed. A ferrule or cap, usually composed of brass or copper, is forced on over the projecting end of the mandrel and also over the ends of the foil disposed thereagainst. The ferrule is secured to the mandrel by staking, which staking also pierces the projecting ends of the foil and establishes a low resistance electrical connection between the foil and the ferrule. A terminal wire is soldered to the ferrule and extended from the condenser.

To guard against the possibility of these ferrules coming into contact with metallic parts of the device in which the condensers are assembled and thereby establish an unwonted electrical connection to the condenser, manufacturers have heretofore coated the ferrules with a wax or asphaltum which solidifies at ordinary room temperature.

Condensers built in this manner are not altogether satisfactory, particularly since the wax-like substance used to guard the ferrule is frequently chipped off during assembly or melted by the heat of the soldering iron as the terminal wire is attached to its terminal, with the result that a part or all of the ferrule is exposed and trouble is likely to result.

As an object of my invention I have provided a new and improved condenser of this type, a condenser which can be manufactured economically, and which overcomes the objections raised against the devices of the prior art.

In the preferred embodiment of my invention, the condenser unit is wound as a non-inductive type condenser, that is, with one foil projecting from one end of its cylindrical body and the other foil projecting from the opposite end. The condenser thus formed is fitted into a rigid insulating casing, preferably a length of tubing, into which it snugly fits. The condenser is sealed in this casing by means of cup-like metallic members fitted into the casing and pressed against the ends of the condenser, to thereby establish an electrical connection with it and to expand it slightly into firm engagement with the walls of the casing itself. The terminal wire is attached to this metallic casing and led out of the open ends of the casing, which ends may be closed by a suitable sealing wax or other similar insulating material if desired.

The condenser thus formed has no metallic parts exposed except the terminal wires themselves, and can therefore be assembled in a radio set or other similar device without danger of it being shorted out by coming into contact with a metallic part of that device.

My invention can best be understood by reference to the accompanying drawing in which a preferred embodiment of it is shown by way of example, and in which.

Figure 1:
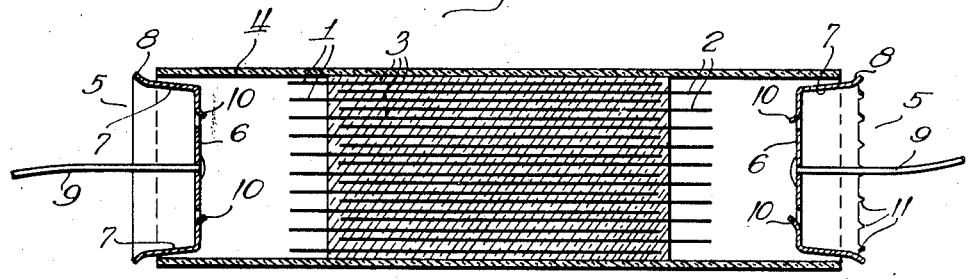
Figure 1 is a cross sectional view of a partly assembled condenser.

Referring now to the drawing in more detail, it will be seen that the condenser consists of metallic foils 1 and 2 which are separated by insulating members 3, and wound as a cylinder with the foil 1 projecting from its left hand end and the foil 2 from its right hand end. These foils 1 and 2 are very thin metallic foil, and the insulating members 3 are preferably several thicknesses of very thin high grade electric paper, such as is customarily employed in the manufacture of condensers of this type. The cylindrical body formed by rolling these foils and papers is solid, compact and free from voids or air pockets.

The casing into which the condenser thus formed is assembled consists of tubing 4 having relatively thick walls whose inside diameter is slightly greater than the outside diameter of the cylindrical condenser. The casing 4 may be a length of fiber tubing, either a molding tubing, or a rolled tubing, the latter being preferable since it is less expensive than a molded tubing. While fiber is chosen because of its cheapness, obviously tubes composed of other insulating material may be used in lieu thereof if desired.

In order to establish an electrical connection with the projecting ends of the foils 1 and 2 and to rigidly hold the condenser assembly in the casing 4, I have provided cup-like members indicated generally at 5 and consisting of a disc 6 whose diameter is substantially less than the internal diameter of the casing. A flange 7 is projected outwardly from the perimeter of the disc, forming a cup-like body whose free edge is flared outwardly as indicated at 8, to form a rim. The diameter of the outermost edge of the flared rim 8 is slightly greater than the inside diameter of the casing 4, and preferably less than the outside diameter of that casing. The disc 6 is perforated at its center, and the terminal wire 9 is extended through this perforation and rigidly attached to the disc in any preferred manner such as by soldering. If desired, although it is not necessary to do so, the disc may also be provided with upstanding ears 10 punched out of it and projecting from the face of it which will subsequently engage the overhanging ends of the foils of the condenser. If desired, the rim 8 of the flange may be serrated as indicated at 11 to provide a plurality of outwardly projecting relatively sharp points.

Figure 2:
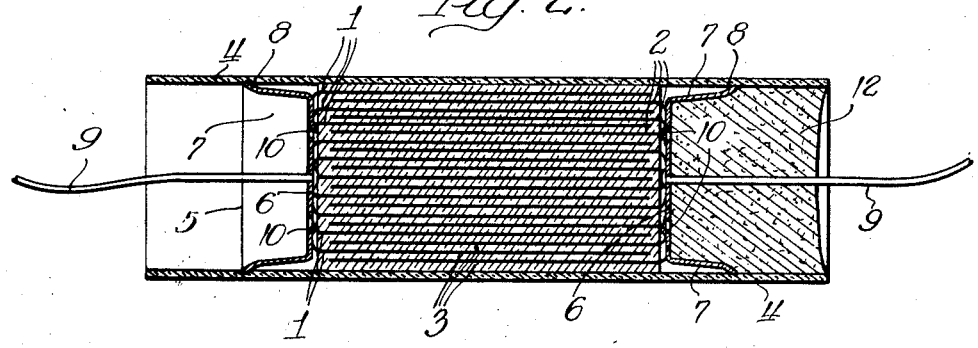
Figure 2 is a cross sectional view of a condenser of Figure 1 after it has been completely assembled.
Figure 3:
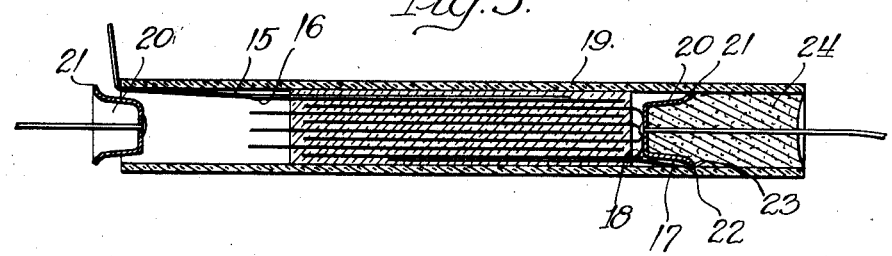
Figure 3 is a similar view of a slightly modified form of condenser.

A connecting member 5 is placed in each end of the casing 4 and pressed into firm engagement with the condenser in any preferred manner such as by a kick press. The disc 6 and ears 10 projecting from it bend over the projecting ends of the foil 2 of the condenser and establish a good electrical contact with that foil, the ears biting into it in the manner shown in Figure 2 to insure that the contact thus formed will be of low resistance.

Since the diameter of the outermost portion of the rim 8 of the member 5 is slightly greater than the internal diameter of the casing 4, as the member is forced into the casing and against the condenser, the casing will compress the flange 7 and rim 8 against the hoop strength of the rim, the amount of this compression being greater than the possible flexibility of the rim, that rim will bite into the walls of the casing. When the pressure which is employed to force the member 5 into the ends of the casing is removed, the pressure stored up in the condenser will attempt to force the member out of the casing, thereby causing the rim to more firmly bite into the walls of the casing and firmly hold the members 5 in it. Preferably the members are pressed into the casing with sufficient pressure to cause them to compress the condenser slightly longitudinally of its axis, this compression tending to expand it into a more firm engagement with the walls of the casing. The assembly thus formed is therefore tight and rigid and since the rim 8 is biting into the walls of the casing itself, the assembly will remain tight indefinitely. If the rim is provided with serrations 11, it will bite deeper into the walls of the casing and thereby more securely bind the members 5 in place. I have found however that if the internal diameter of the casing is of the order of one-half an inch or less, the use of these serrations is not necessary to securely bind the members 6 in place. If the internal diameter of the tube is larger than one-half of an inch, the metal from which the member 5 is made must necessarily be slightly thicker, in order to give the required strength to the disc 6, and since the metal is thicker the amount of flexibility of the rim 8 is decreased, and the use of serrations 11 is therefore advisable.

After the condenser has been assembled in the manner above indicated, it is impregnated in a suitable moisture proofing compound such as paraffin wax or any of the other wax substances now commonly used for this purpose. If desired, the open end of the casing may be closed by a sealing compound 12 poured in its molten state and allowed to harden therein, this compound flowing over the outer face of the disc 6 and inner faces of the flanges 7 and casing 4 to tightly seal the casing against the entrance of moisture.

I have found that condensers built in the foregoing manner are very rigid and capable of withstanding large stresses placed upon the wires 9 in tension, without pulling those wires out of the disc 6 or pulling the sealing members 5 out of the casing itself.

In certain instances, particularly condensers having a very low capacitance, the condenser does not contain a sufficient number of convolutions of paper and foil to give it sufficient end surface to permit establishing good electrical connection with its overhanging foils by means of pressure alone. In such instances, a thin metallic ribbon 15 is wound in the condenser in engagement with one of its foils 16, and projected for a considerable distance from the end of the cylinder thus formed. A second metallic ribbon 17 is wound into the condenser in engagement with the foil 18 and likewise extended from the cylinder thus formed. The condenser is then placed in a tubular casing 19 which, because of the small capacity of the condenser, is of small diameter. The condenser is sealed in this casing by means of metallic sealing cups 20 which have flared flanges 21 whose outer diameter is slightly greater than the inner diameter of the casing. The projecting ends of the metallic ribbons 15 and 17 are secured in any preferred manner, and sealing caps 20 are then forced into the casing in engagement with the ends of the condenser in it as before, these caps pressing the ribbons 15 and 17 firmly against the inner wall of the casing. As will be seen at 22, the ribbon is thus bound between the rim 21 of the sealing member and the wall of the casing, this engagement establishing a low resistance electrical connection between the ribbon and the sealing member. The end of the ribbon projecting beyond the sealing member may be cut off as indicated at 23 so that when the open end of the casing is sealed by a compound 24 the ribbon does not project beyond it. Connection to the condenser is made by wire 25 soldered or otherwise attached to the sealing member 20 as before.

While I have shown and described my invention as applied to a condenser, I have done so by way of example only, as small choke coils and other similar devices may be sealed in a casing by the same arrangements herein described.

Having thus complied with the statutes, and shown and described a preferred embodiment of my invention, what I consider new and desire to have protected by Letters Patent is pointed out in the appended claims.

What is claimed is:

1. A condenser comprising a pair of metallic foils separated by insulation and rolled into a cylinder with the foils projecting from opposite ends thereof, a cylindrical casing for said condenser composed of a rigid insulating material, a pair of metallic cups having flared edges, said cups fitting in the ends of said casing and being held tightly against the ends of said cylinder by their flared edges which bite into the interior surface of the casing, said cups having upturned ears which bite into the overhanging ends of said foils to establish a low resistance electrical connection therewith, a wire attached to each metallic cup and leading out of the open ends of said casing, and a sealing compound disposed in the ends of said casing over said cups and around said wires.

2. A condenser comprising a rigid cylindrical tubing, alternate layers of paper and foil rolled as a cylinder and disposed in said tubing, cup-like metallic members having flared edges, said members being fitted in opposite ends of said tubing and disposed entirely within the tubing and held tightly against said condenser roll by the engagement of said flared edges with the tubing, and terminals attached to said members and leading out of said tubing.

3. A condenser comprising alternate papers and foils rolled into a cylinder with one foil projecting from one end and the other foil projecting from the other end of it, a rigid tube of insulating material into which said condenser snugly fits, a terminal member fitted into each end of said tube and disposed entirely within the same and held tightly against the end of the condenser by frictional engagement with said tube, and a terminal wire attached to each of said terminal members and leading out of said tube.

4. A cylindrical condenser having a pair of foils one of which extends from each of its ends, a cylindrical casing composed of an insulating material and into which said cylinder snugly fits, a pair of metallic discs each having a flange upstanding from its periphery and terminating in a rim which flares outwardly from its free edge, the perimeter of said rim being slightly greater than the inside perimeter of said casing, said discs being placed within said casing with said flanges extending toward the ends of the casing, said rim biting into the walls of said casing as the disc is forced into it and against said condenser to hold the disc tightly against the end of the condenser.

5. A condenser having a pair of foils one of which extends from each of its ends, a casing composed of an insulating material and into which said condenser snugly fits, a pair of metallic plates having upstanding flanges which terminate in outwardly flaring rims, the perimeter of said rims being slightly greater than the inside perimeter of said casing, said rims biting into the walls of said casing as the plate is forced into it and against said condenser to hold the plate tightly against the end of the condenser, and ears upstanding out of said plates and forced into the projecting ends of said foils to establish an electrical connection therewith.

6. A cylindrical condenser having a pair of foils one of which extends from each of its ends, a cylindrical casing composed of an insulating material and into which said cylinder snugly fits, a pair of metallic discs each having a flange upstanding from its periphery and terminating in a rim which flares outwardly from its free edge, the perimeter of said rim being slightly greater than the inside perimeter of said casing, said discs being disposed in the casing with said flanges extending toward the ends thereof, said casing compressing said flange against the hoop strength of the rim as the disc is forced into it to thereby cause the rim to bite into the walls of the casing and prevent the disc from being forced out of the casing.

In witness whereof, I hereunto subscribe my name this 25th day of March, 1931.

CHARLES H. CAINE.